United States Patent [19]

Baumoel

[11] Patent Number: 5,467,321
[45] Date of Patent: Nov. 14, 1995

[54] INSERTION ULTRASONIC TRANSDUCER WITH MODE CONVERSION AND METHOD FOR REDUCING MULTIPLE SIGNAL RECEPTION

[76] Inventor: Joseph Baumoel, c/o Controlotron Corp. 155 Plant Ave., Hauppauge, N.Y. 11788

[21] Appl. No.: 312,299

[22] Filed: Sep. 26, 1994

[51] Int. Cl.⁶ .............................. H04R 23/00; G01F 1/66
[52] U.S. Cl. .................... 367/140; 73/861.27; 73/861.28
[58] Field of Search .......................... 367/140; 73/861.26, 73/861.27, 861.28

[56] References Cited

U.S. PATENT DOCUMENTS

| | | | |
|---|---|---|---|
| 2,959,054 | 11/1960 | Welkowitz | 73/861.27 |
| 3,237,453 | 3/1966 | Yamamoto et al. | 73/861.27 |
| 3,575,050 | 4/1971 | Lynnworth | 73/861.27 |
| 3,869,915 | 3/1975 | Baumoel . | |
| 3,987,674 | 10/1976 | Baumoel . | |
| 4,208,908 | 6/1980 | Hickox | 73/861.27 |
| 4,232,548 | 11/1980 | Baumoel . | |
| 4,467,659 | 8/1984 | Baumoel | 73/861.27 |
| 5,271,267 | 12/1993 | Baumoel | 73/54.41 |
| 5,277,070 | 1/1994 | Dorr | 73/861.28 |
| 5,365,778 | 11/1994 | Sheen et al. | 73/54.41 |

*Primary Examiner*—Charles T. Jordan
*Assistant Examiner*—Theresa M. Wesson
*Attorney, Agent, or Firm*—Ostrolenk, Faber, Gerb & Soffen

[57] ABSTRACT

An insertion type ultrasonic transducer assembly adapted to be mounted to a pipe for determining ultrasonic energy transit time through fluid in the pipe. The assembly includes an ultrasonic transducer and a coupling rod having the ultrasonic transducer mounted on a first end thereof and having a second end thereof adapted for disposition through an opening in a fluid containing pipe. The first end has a surface formed at a first angle which ensures that substantially all ultrasonic energy emitted by the transducer in a primary beam is converted at least once from a first mode to a second mode at a boundary surface of the coupling rod, thereby resulting in emission of a longitudinal mode wave at the second end of the coupling rod into the fluid in the pipe. The second end is formed at a second angle which ensures that the emitted longitudinal mode wave is emitted orthogonally with respect to the surface of the second end without refraction as the emitted wave enters the fluid in the pipe. The device allows for more accurate determination of ultrasonic energy transit time through the fluid in the pipe by eliminating or substantially reducing multiple receive signals.

31 Claims, 3 Drawing Sheets

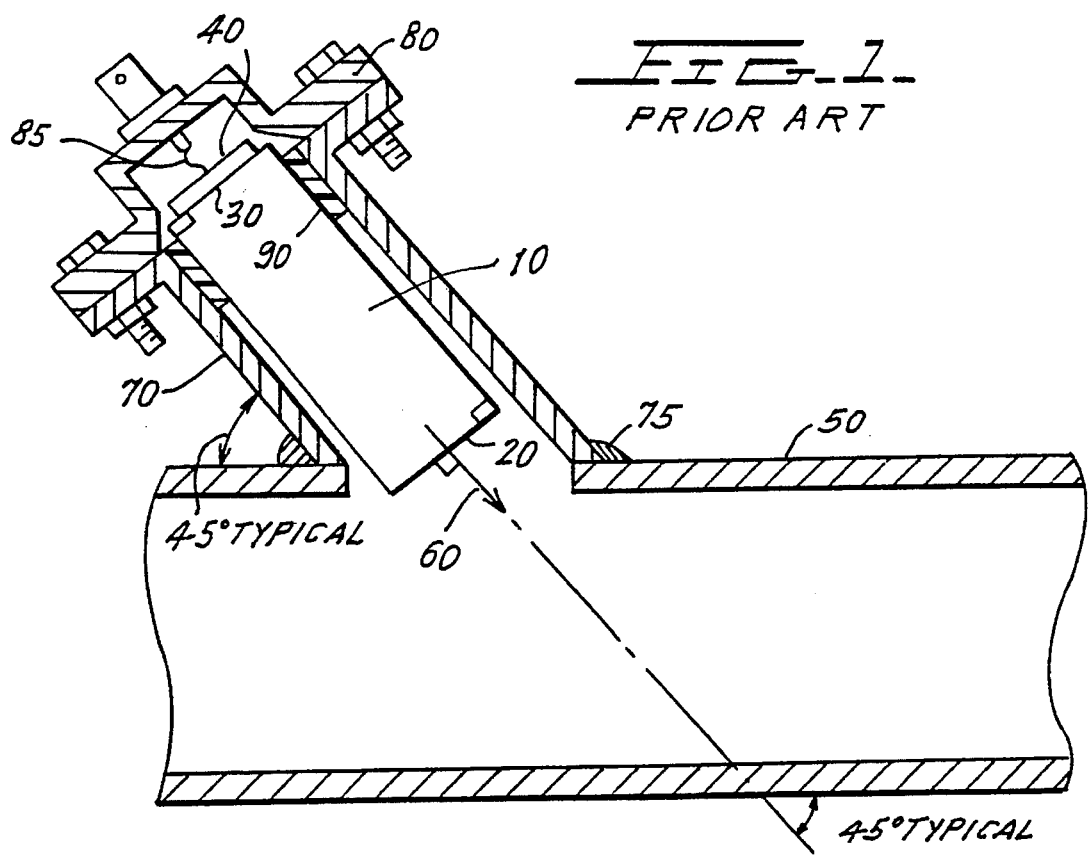
FIG. 1
PRIOR ART
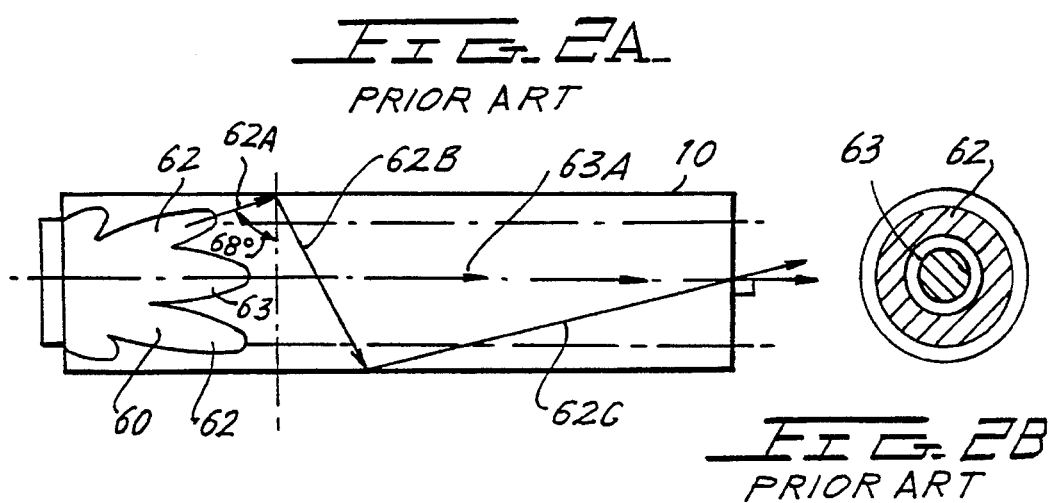
FIG. 2A
PRIOR ART
FIG. 2B
PRIOR ART

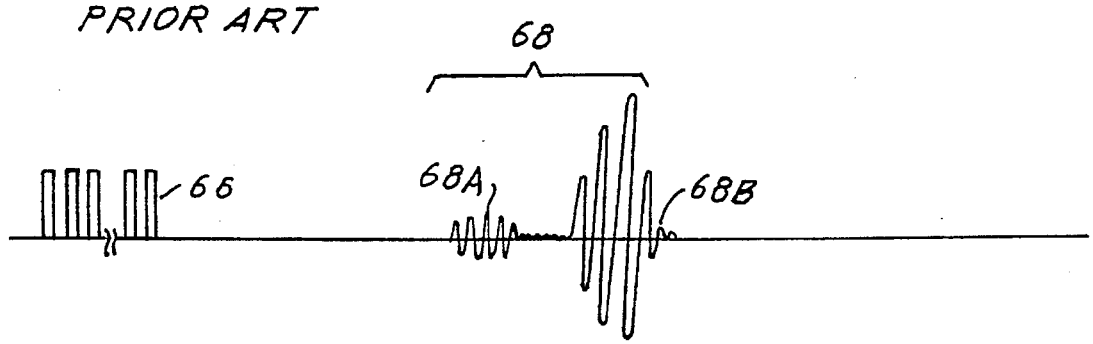
FIG. 3 PRIOR ART
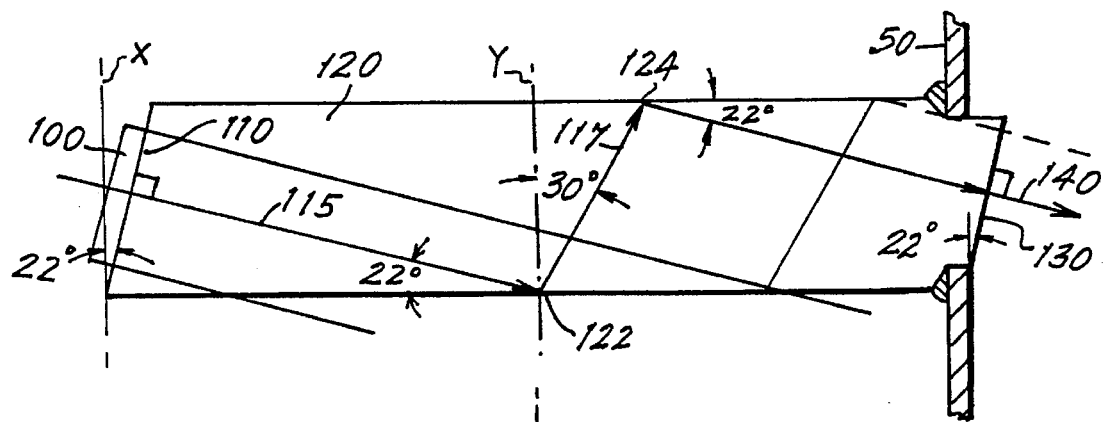
FIG. 4A
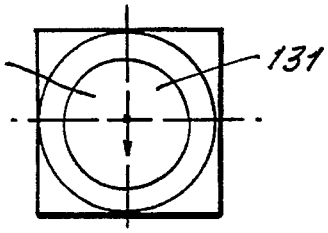
FIG. 4B
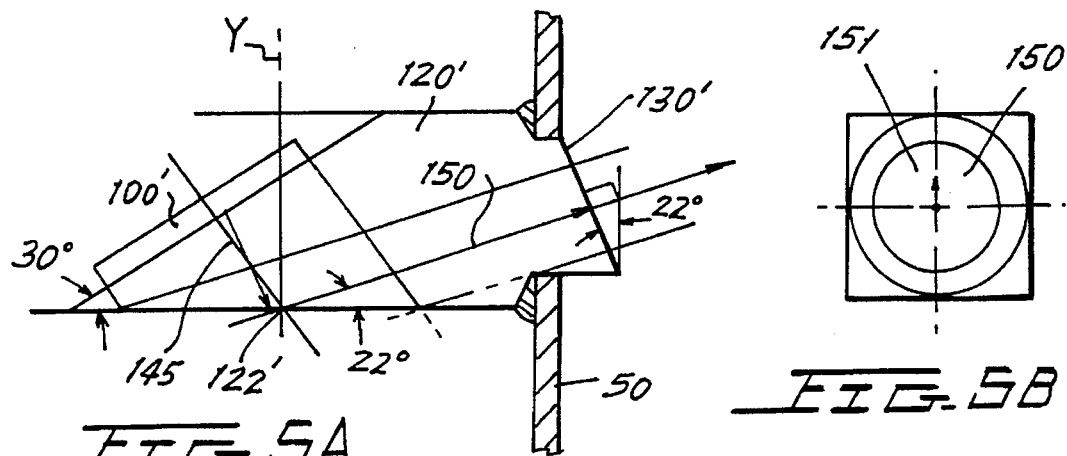
FIG. 5A
FIG. 5B

INSERTION ULTRASONIC TRANSDUCER WITH MODE CONVERSION AND METHOD FOR REDUCING MULTIPLE SIGNAL RECEPTION

BACKGROUND OF THE INVENTION

The use of ultrasonic transducers for determining flow rate is well known. For example, see U.S. Pat. Nos. 3,869,915, 3,987,674 and 4,232,548. Clamp-on ultrasonic transducer flowmeters are convenient to use because they do not require cutting a hole into a pipeline to determine the flow rate. They rely on the determination of sonic propagation velocity of ultrasonic energy emitted through the pipe wall into the fluid in the pipe to calculate the flow rate and can also be used to determine other characteristics or circumstances in a pipeline, for example, they can be used to determine if leaks have occurred.

In some ultrasonic flowmeter applications, however, it is desirable to use an insertion type transducer, i.e., one in which the mounting to the pipeline must be made through a hole in the pipeline. The situations in which an insertion type transducer are utilized are usually dominated by those in which very high temperatures are encountered, or wherein the pipeline contains very low sonic impedance media, such as gases.

The conventional state of the art transducer of the insert type is characterized as shown in FIG. 1, in which a coupling rod 10 is prepared with square cut end faces 20 and 30, on one end 30 of which a piezoelectric crystal 40 is mounted. The other end 20 is introduced into the pipe 50 through a cut to act as a radiative surface. Since it is necessary for the beam 60 to be emitted in an orthogonal relationship to the emitting surface 20, and to avoid reflection, the rod 10 is mounted at an angle to the pipe 50, generally around 45 degrees, as shown. In general, the rod 10 is not welded to the pipe 50 directly, but is normally mounted within an outer tubular mounting assembly 70, which is welded into place, as shown at 75. The weld typically acts as a sealing surface for the rod structure. Generally, an end cap 80 is bolted to the structure 70 to close off the structure 70 and also to allow the connection of wires 85 to the transducer. A seal 90 is typically provided between the rod 10 and the structure 70 at the cap 80. In some cases, arrangements are made for the rod 10 to be installed by means of a "hot tap" assembly, allowing for its installation to a pipe which is in operation and under pressure.

The difficulty with this type of transducer is that the crystal 40, which can operate either in the longitudinal or transverse mode, has a beam spread pattern 60 which hits the side wall of the rod as shown in FIG. 2A. The beam spread pattern 60 typically includes a primary longitudinal ray 63 whose axis is shown at 63A and several side lobes, e.g. as shown at 62. The energy distribution in the coupling rod 10 of the beam pattern 60 is shown in FIG. 2B. As shown, the side lobes 62 form a generally circular pattern concentric about the primary ray 63. In the case shown, the side lobes 62 of the beam pattern 60 usually include an angle, such as near 68 degrees for a longitudinal wave and 30 degrees for an injected shear wave, which generates conversion of a substantial percentage of the injected mode to the alternate mode, i.e., from longitudinal to shear, or vice versa. Thus, an injected beam generates a shear wave which contains much energy, since the side lobes 62 of the injected wave are substantial.

As shown in longitudinal cross section in FIG. 2A, a longitudinal ray 62A of side lobe 62 is first incident at the boundary of the rod 10 at an angle of approximately 68 degrees to the normal. The wave 62A is converted into a shear wave 62B traveling substantially transversely across the rod 10 to impact the boundary again further down the coupling rod 10, where it is remode converted to a longitudinal wave 62C. In the case of an injected longitudinal wave as shown in FIG. 2A, the twice mode converted wave 62C emerges from the rod late, since the converted shear wave 62B travels at a much lower propagation velocity than the longitudinal waves 62A and 62C. This generates a received signal at a receiving transducer assembly as shown in FIG. 3. The transmitted waveform is shown at 66 in FIG. 3 and the received waveform includes a primary longitudinal receive waveform from the primary longitudinal ray 63 which arrives early and has low amplitude, as shown at 68A and the mode converted wave form 68B which arrives late and has most of the energy. Such a multiplicity of receive signals, displaced in time, prevents generation of a fully coherent signal, and results in difficulty in identifying the exact time of arrival of the signal, resulting in flow computation errors, since the accuracy of ultrasonic flowmeters is highly dependent on determination of the exact transit time of the sonic beam through the fluid.

It has not been shown in FIG. 1, but a transducer assembly identical to that shown in FIG. 1 is typically mounted on the opposite side of the pipeline, in a line with the longitudinal axis of the emitted beam 60 as well known to those of skill in the art. The transit time for the some energy to go from one transducer to the other is normally determined and then used in the calculation of the sonic propagation velocity, which is then used to determine flow rate.

SUMMARY OF THE INVENTION

As described below, the invention overcomes the above described difficulty by means of a technique which turns the mode conversion to advantage thereby eliminating a multiplicity of sonic beams in the transducer coupling rod.

It accordingly is an object of the present invention to provide an insert type transducer assembly which substantially reduces the multiple received signals caused by mode conversion in the transducer coupling assembly.

It is still a further object of the present invention to provide an improved insert type ultrasonic transducer assembly.

It is yet still a further object of the present invention to provide an improved insert type ultrasonic transducer assembly which allows for greater precision in the determination of ultrasonic transit times through fluids and, in particular, more precise determination of flow rates or other computations dependent upon the determination of ultrasonic transit time and sonic propagation velocity.

The above and other objects of the present invention are achieved by an insertion type ultrasonic transducer assembly adapted to be mounted to a pipe for determining ultrasonic energy transit time through fluid in the pipe, comprising an ultrasonic transducer and a coupling rod having the ultrasonic transducer mounted on a first end thereof and having a second end thereof adapted for disposition through an opening in a fluid containing pipe, the first end having a surface formed at a first angle which ensures that substantially only ultrasonic energy emitted by the transducer in a primary beam is converted at least once from a first mode to a second mode at a boundary surface of the coupling rod, thereby resulting in emission of a longitudinal mode wave at the second end of the coupling rod into the fluid in the pipe, the second end being formed at a second angle which ensures that the emitted longitudinal mode wave is emitted orthogonally with respect to the surface of the second end without refraction as the emitted wave enters the fluid in the pipe.

The objects of the invention are also achieved by a method for substantially reducing multiple receive signals from ultrasonic energy traveling through a fluid in a pipe from an ultrasonic transducer to a receiver, comprising attaching an ultrasonic transducer to a first end of a coupling rod and inserting a second end of the coupling rod into an opening in a fluid containing pipe, forming the first end with a surface having a first angle which ensures that substantially only ultrasonic energy emitted by the transducer in a primary beam is converted at least once from a first mode to a second mode at a boundary surface of the coupling rod, thereby resulting in emission of a longitudinal mode wave at the second end of the coupling rod into the fluid in the pipe and forming the second end to have a surface at a second angle which ensures that the emitted longitudinal mode wave is emitted orthogonally with respect to the surface of the second end without refraction as the emitted wave enters the fluid in the pipe.

Other advantages, objects and features of the invention will be apparent from the detailed description which follows.

BRIEF DESCRIPTION OF THE DRAWING(S)

The invention will be described in greater detail in the following detailed description with reference to the drawings in which:

FIG. 1 shows the previously described prior art insert type ultrasonic transducer mounted to a pipeline;

FIG. 2A shows the effects of mode conversion in the coupling rod of an ultrasonic transducer assembly of the type shown in FIG. 1;

FIG. 2B is a cross sectional view of the emitted beam pattern from the coupling rod of FIG. 2A showing the lobe patterns of the energy in the primary and side lobes;

FIG. 3 shows the transmitted signal emitted by the transducer of FIG. 1 and the received signal in the receiving transducer assembly corresponding to FIG. 1, showing the effect of mode conversion on the received signals, whereby two signals are received, resulting in difficulty in determining exact time of arrival of the received signal;

FIG. 4A shows one embodiment of the transducer assembly according to the present invention showing a longitudinal mode crystal mode converter rod construction according to the present invention which substantially reduces the reception of multiple signals at the receiver;

FIG. 4B shows the emission pattern of the emitted waves according to the embodiment of the present invention shown in FIG. 4A;

FIG. 5A shows a shear mode crystal mode conversion rod construction according to the present invention which is suitable for use at low frequencies, especially for pipelines containing gases;

FIG. 5B shows the output beam pattern of the device shown in FIG. 5A;

Figure 6:
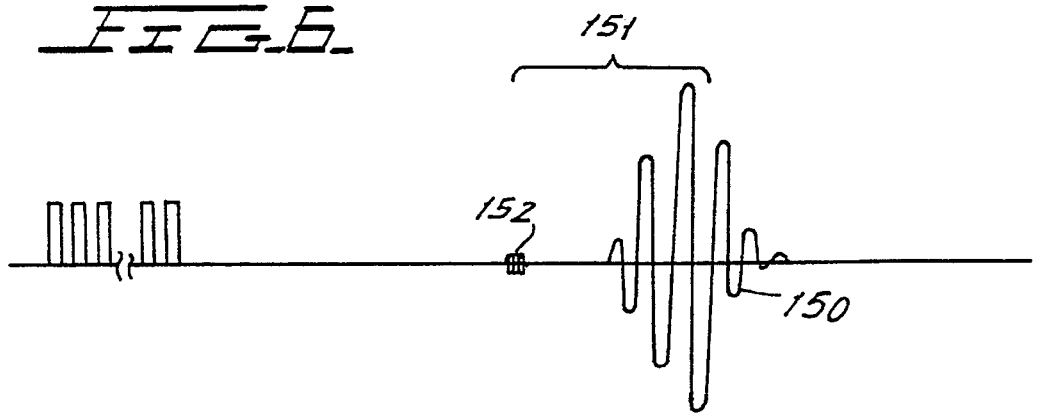
Figure 7:
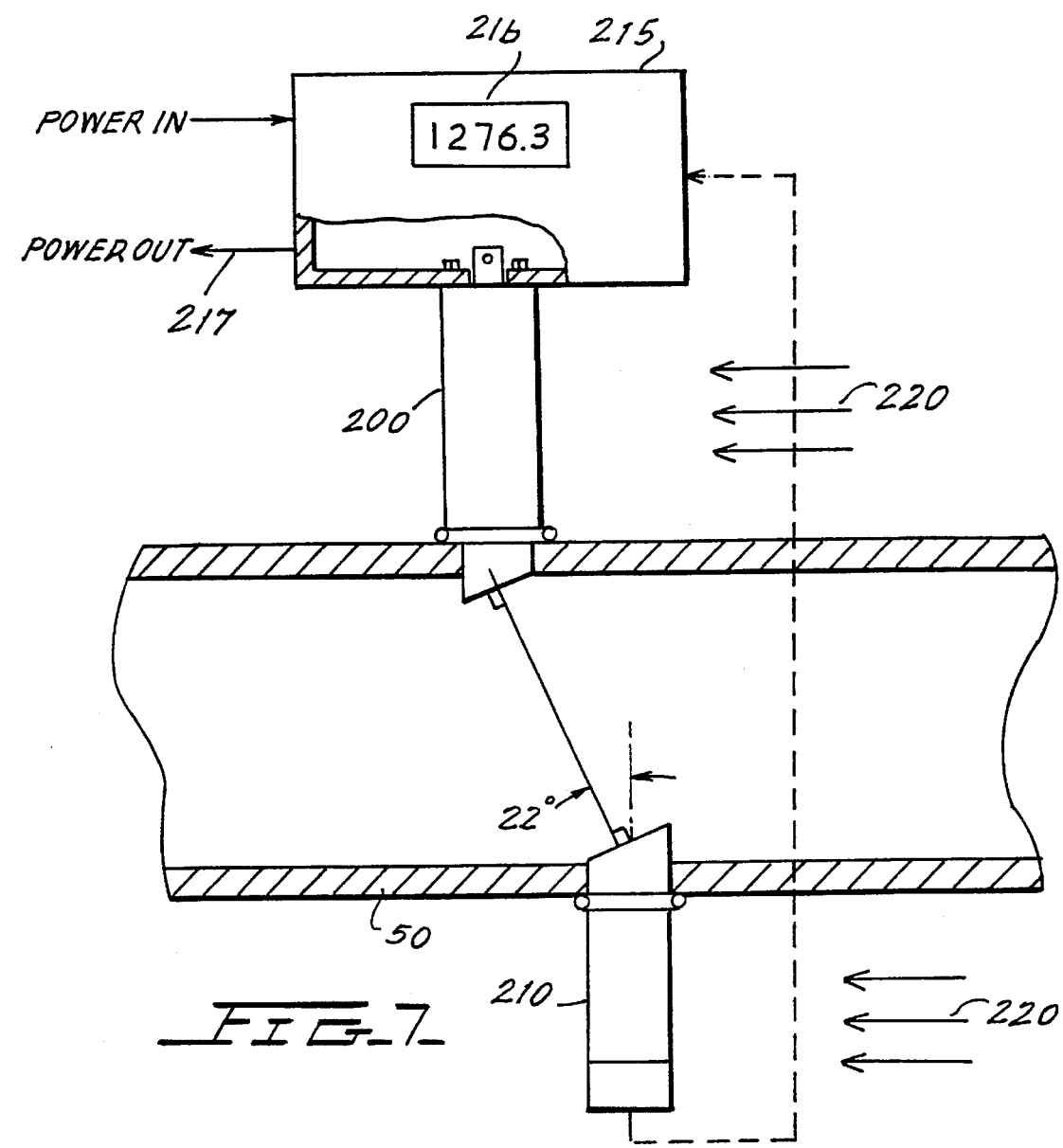

FIG. 6 shows the transmitted signal from an emitting transducer of a transmitting transducer assembly and the received signal in a receiving transducer assembly according to the present invention, showing that the reception of multiple signals has been eliminated or substantially reduced so that essentially all the energy is now in the mode converted signal; and FIG. 7 shows a typical example of a mode converted transducer installation for determining flow rate according to the present invention.

DETAILED DESCRIPTION OF EMBODIMENTS OF THE INVENTION

With reference now to drawings FIGS. 4A–7, the mode conversion technique according to the present invention can be used for transducers which employ either longitudinal or transverse mode crystals, the latter of which are used when lower frequencies are desired, as in the case of fabricating a gas transducer, where gas excessively attenuates high frequencies. The two constructions are shown, respectively in FIGS. 4A and 5A. FIG. 4A shows the construction of a coupling rod for a longitudinal mode crystal transducer and FIG. 5A shows the construction of the converter rod for a shear mode crystal transducer suitable for low frequency gas applications.

In the case of the longitudinal mode crystal converter rod, shown in FIG. 4A, the longitudinal mode crystal 100 is mounted on a first surface 110 of a coupling rod 120, of which a surface is formed at an angle of approximately 22 degrees with respect to line X, i.e., 22° from a square cut, as shown. This results in an angle of impingement of a ray 115 normal to the surface 110 on the rod 120 boundary surface at 122 of approximately 68 degrees from the normal (line Y) or 22 degrees with respect to the rod 120 boundary surface. The dimensions of the rod 120, under these circumstances, are such that essentially all of the energy of the beam 115 "is in the near" field, i.e., the primary lobe, and is all at essentially the same angle, precluding significant energy at a different angle. Since the rod 120 is made of a grade of steel which has a Poisson's ratio of 0.26, or as close to this as is practical, essentially all of the longitudinal mode beam energy will be converted to shear, or transverse mode as shown in ray 117. The shear wave 117 travels at a lower velocity than the injected longitudinal wave 115, and, therefore, has a greater aperture, serving to enhance the maintenance of beam collimation. The angle of reflection at 122 of the rod 120 boundary surface is not equal to the angle of incidence, due to this mode conversion, and for most steel rods, will be at an angle of about thirty degrees from the normal Y, as shown.

The reflected shear mode beam 117 then impinges again on the boundary surface of the rod 120 at 124 at an approximately 30 degree angle to the normal Y. If the Poisson's ratio is 0.26, or close to this figure, essentially all of the shear beam 117 is reconverted to longitudinal mode, at an angle of approximately 22 degrees relative to the rod 120 wall (approximately 68 degrees to the normal Y) and therefore at an angle of approximately 22 degrees relative to the normal to the pipe 50 wall. If a "window" is cut at the end 130 of the coupling rod 120 by cutting the rod at the angle of approximately 22 degrees as shown, the beam 140 will emerge orthogonally to the rod end 130, and will not refract as it enters the fluid in the pipe. As shown, this permits the rod 120 to be introduced into the pipe wall normal to the pipe surface, resulting in a beam angle in the liquid of 22 degrees with respect to the normal to the pipe wall. This is essentially equivalent to that of a clamp-on transducer, insuring equal sensitivity to that method.

The result of the dual mode conversion in the device of FIG. 4A, i.e., the mode conversion at 122 and 124 at the boundary of the coupling rod 120, in a rod of the correct material, with a Poisson's ratio close to 0.26, is that essentially all of the energy introduced into the rod is confined to one emergent time after injection, avoiding the multiplicity of modes which aberrate the received wave shape and make the determination of the exact transit time of the beam through the fluid in the pipe difficult or impossible to determine. This is shown graphically in FIG. 6. As shown, in the received signal 151, signal 150 has essentially all of the energy which is in the twice mode converted wave. The primary longitudinal receive signal 68A of FIG. 3, which would be found at 152 in the conventional device, has now been eliminated or substantially minimized. Thus, the accuracy of this design will be markedly superior to any current known alternative method. FIG. 4B shows, in cross section, that substantially all of the energy (in ray 140) is found in region 131. Note the absence of a concentric side lobe region, in contrast to FIG. 2B.

In addition, there are several other advantages to this method. Being orthogonally installable on the pipeline, as shown in FIGS. 4A and 5A, through an orthogonally drilled hole, as compared to one drilled at some angle, makes installation far simpler. In fact, it is possible to weld the rod directly to the pipe wall, as shown, eliminating the need for an outer tubular mounting device, usually provided in the conventional device, as shown in FIG. 1. Another advantage is that the surface 130, 130' angle of only 22 degrees, as compared to the 45 degree angle (with respect to the pipe wall) normally employed, results in a much smaller well, minimizing the collection of beam absorbing debris, if a housing 70 is employed. As an alternative, as shown in FIG. 4A, the small angle permits the entire angulated emitting surface to be located inside the pipe interior, eliminating the well altogether. This is possible since the hollow angle will not cause an unreasonable pressure drop. It will also avoid any severe flow profile distortion, improving flow calibration as compared to the 45 degree insert design shown in FIG. 1.

It should be noted that the same consideration as applied to the longitudinal design of FIG. 4A also applies to the transverse mode crystal design as shown in FIG. 5A. The design in FIG. 5A, instead of employing an angle at the end 110' of 22 degrees, employs an angle of 60 degrees to the normal Y, or 30 degrees to the coupling rod 120' boundary surface. This results in impingement at 122' of the shear mode beam 145 at an angle of approximately 60 degrees, resulting in a reflected wave 150 at an angle of approximately 22 degrees to the rod boundary surface or 68 degrees from the normal Y. The end 130' of rod 120' is again cut at an angle of approximately 22 degrees to the pipe 50 wall, resulting in the beam entering the fluid at an angle of 22 degrees to the normal to the pipe wall.

As shown in FIGS. 4A and 5A, because of its simpler design, the coupling rod 120 and 120' can be welded directly to the pipe wall, if desired.

In the design of FIG. 5A, it is naturally essential that the beam strike the emitting surface 130' in a longitudinal mode, since liquids and gases do not support shear or transverse mode energy transfer. Accordingly, in the device of FIG. 5A, only one mode conversion is employed, in contrast to the coupling rod shown in FIG. 4A. FIG. 5B shows the beam pattern of the exit beam 150. Since all the energy is concentrated in substantially one region 151, the multiple reception problem of FIG. 3 is avoided.

FIG. 7 shows a typical installation for the mode converted transducer assemblies described. Two such transducer assemblies 200 and 210 in accordance with the invention are employed. The two transducers are coupled to a flow computer 215, which determines the transit time for a pulse or pulses of ultrasonic energy to travel through the fluid in the pipeline from one transducer to the other. Based on the measured transit time and the known distance from one transducer assembly to the other, the sonic propagation velocity can be determined. From this and knowledge of the fluid, the flow velocity and other characteristics can be determined and displayed on a display device 216. Data 217 can also be sent to a master terminal for display and computation of other characteristics or occurrences, e.g. determinations of leaks. As shown, preferably for simplicity, the transducer assemblies are welded directly to the pipe wall and mounted orthogonally to the pipe wall, as described above. The inventor's experience has been that the transducer assemblies must be mounted on opposite sides of the pipe wall. If the transducers are mounted on the same side, using the reflection mode at the opposite pipe wall, it has been found that an echo chamber is created, resulting in improper operation of the device. This occurs, it is believed, because the transmit transducer sends a signal into both the liquid and the pipe wall. The signal in the pipe is very strong and travels just a short distance and enters through the weld to the transmit transducer and reflects back into the pipe. Thus, the echo chamber is entirely within the pipe.

When the receive transducer is mounted on the opposite wall, as shown, the signal travels through the pipe wall at a shallow angle and the transmitting transducer never receives an echo signal because the signal impinges downstream on the pipe wall.

As shown in FIG. 7, it may be necessary to provide an air cooling chamber to force cooled air 220 at the transducer assemblies for high temperature applications.

Although the present invention has been described in relation to particular embodiments thereof, many other variations and modifications and other uses will become apparent to those skilled in the art. Therefore, the present invention should be limited not by the specific disclosure herein, but only by the appended claims.

What is claimed is:

1. An insertion type ultrasonic transducer assembly adapted to be mounted to a pipe for determining ultrasonic energy transit time through a fluid in the pipe, comprising:

an ultrasonic transducer; and a coupling rod having the ultrasonic transducer mounted on a first end thereof and having a second end thereof adapted for disposition through an opening in a fluid containing pipe, the first end having a surface formed at a first angle which ensures that substantially only ultrasonic energy emitted by the transducer in a primary beam is converted at least once from a first mode to a second mode at a boundary surface of the coupling rod, thereby resulting in emission of a longitudinal mode wave at the second end of the coupling rod into the fluid in the pipe, the second end being formed at a second angle which ensures that the emitted longitudinal mode wave is emitted orthogonally with respect to a surface of the second end without refraction as the emitted wave enters the fluid in the pipe.

2. The ultrasonic transducer assembly of claim 1, wherein said transducer comprises a longitudinal mode transducer and said first and second angles are approximately 22° with respect to a wall of the pipe and said coupling rod is mounted at an angle of 90° with respect to the pipe wall.

3. The ultrasonic transducer assembly of claim 2, wherein the coupling rod has a Poisson's ratio of approximately 0.26.

4. The ultrasonic transducer assembly of claim 3, wherein the coupling rod comprises steel.

5. The ultrasonic transducer assembly of claim 1, wherein the coupling rod is welded to the pipe wall.

6. The ultrasonic transducer assembly of claim 2, wherein the coupling rod is welded to the pipe wall.

7. The ultrasonic transducer assembly of claim 1, wherein said transducer comprises a shear mode transducer and said first angle is approximately 60° with respect to a wall of the pipe and said second angle is approximately 22° with respect to the pipe wall and said coupling rod is mounted at an angle of 90° with respect to the pipe wall.

8. The ultrasonic transducer assembly of claim 7, wherein the coupling rod has a Poisson's ratio of approximately 0.26.

9. The ultrasonic transducer assembly of claim 8, wherein the coupling rod comprises steel.

10. The ultrasonic transducer assembly of claim 7, wherein the coupling rod is directly welded to the pipe wall and orthogonal to the pipe axis.

11. The ultrasonic transducer assembly of claim 1, wherein said transducer comprises a longitudinal mode transducer and wherein said first angle is such that a beam emitted by said transducer is reflected twice at a boundary surface of said coupling rod, thereby undergoing a first mode conversion from longitudinal mode to shear mode and then from shear mode to longitudinal mode before being emitted as said emitted longitudinal mode wave at the second end of the coupling rod.

12. The ultrasonic transducer assembly of claim 1, wherein said transducer comprises a shear mode transducer and wherein said first angle is such that a beam emitted by said transducer is reflected only once at a boundary surface of said coupling rod, thereby undergoing a single mode conversion from shear mode to longitudinal mode before being emitted as said emitted longitudinal mode wave at the second end of the coupling rod.

13. The ultrasonic transducer assembly of claim 12, wherein the fluid in the pipe comprises a compressed gas.

14. The ultrasonic transducer assembly of claim 11, wherein the fluid in the pipe comprises a liquid.

15. The ultrasonic transducer assembly of claim 1, wherein two said transducer assemblies are provided, and further comprising a computer coupled to said two transducer assemblies for determining transmit time of ultrasonic energy transmitted from one assembly to the other assembly through fluid in the pipe.

16. A method for substantially reducing multiple receive signals from ultrasonic energy traveling through a fluid in a pipe from an ultrasonic transducer to a receiver, comprising:

attaching an ultrasonic transducer to a first end of a coupling rod and inserting a second end of the coupling rod into an opening in a fluid containing pipe;

forming the first end with a surface having a first angle which ensures that substantially only ultrasonic energy emitted by the transducer in a primary beam is converted at least once from a first mode to a second mode at a boundary surface of the coupling rod, thereby resulting in emission of a longitudinal mode wave at the second end of the coupling rod into the fluid in the pipe; and forming the second end to have a surface at a second angle which ensures that the emitted longitudinal mode wave is emitted orthogonally with respect to the surface of the second end without refraction as the emitted wave enters the fluid in the pipe.

17. The method of claim 16, wherein said step of attaching an ultrasonic transducer comprises providing a longitudinal mode transducer and said step of forming the first and second ends comprises forming the first and second angles at approximately 22° with respect to a wall of the pipe and mounting said coupling rod at an angle of 90° with respect to the pipe wall.

18. The method of claim 17, further comprising providing said coupling rod with a Poisson's ratio of approximately 0.26.

19. The method of claim 18, further comprising providing a coupling rod comprising steel.

20. The method of claim 16, further comprising welding the coupling rod to the pipe wall.

21. The method of claim 17, further comprising welding the coupling rod to the pipe wall.

22. The method of claim 16, further comprising providing said ultrasonic transducer as a shear mode transducer, forming said first angle at approximately 60° with respect to a wall of the pipe and forming said second angle at 22° with respect to the pipe wall and mounting said coupling rod at an angle of 90° with respect to the pipe wall.

23. The method of claim 22, further comprising providing said coupling rod with a Poisson's ratio of approximately 0.26.

24. The method of claim 23, further comprising providing a coupling rod comprising steel.

25. The method of claim 22, further comprising welding the coupling rod to the pipe wall.

26. The method of claim 16, wherein said transducer comprises a longitudinal mode transducer and further comprising forming said first angle such that a beam emitted by said transducer is reflected twice at a boundary surface of said coupling rod, thereby undergoing a first mode conversion from longitudinal mode to shear mode and then from shear mode to longitudinal mode before being emitted as said emitted longitudinal mode wave at the second end of the coupling rod.

27. The method of claim 16, wherein said transducer comprises a shear mode transducer and further comprising forming said first angle such that a beam emitted by said transducer is reflected once at a boundary surface of said coupling rod, thereby undergoing a single mode conversion from shear mode to longitudinal mode before being emitted as said emitted longitudinal mode wave at the second end of the coupling rod.

28. The method of claim 27, wherein the fluid in the pipe comprises a compressed gas.

29. The method of claim 26, wherein the fluid in the pipe comprises a liquid.

30. The method of claim 16, wherein the fluid in the pipe comprises a liquid.

31. The method of claim 15, further comprising providing a second ultrasonic transducer assembly as said receiver and coupling a computer to said two transducer assemblies for determining transit time of ultrasonic energy transmitted from one assembly to the other assembly through fluid in the pipe.

\* \* \* \* \*